United States Patent [19]
Anan et al.

[11] Patent Number: 5,148,721
[45] Date of Patent: Sep. 22, 1992

[54] AUTOMATIC FUZZY SPEED CONTROL SYSTEM FOR VEHICLE

[75] Inventors: Yoshiaki Anan, Hiroshima; Satoru Ando, Higashi-Hiroshima; Takeshi Murai, Hatsukaichi, all of Japan

[73] Assignee: Mazda Motor Corporation, Hiroshima, Japan

[21] Appl. No.: 668,143

[22] Filed: Mar. 11, 1991

[30] Foreign Application Priority Data

Mar. 12, 1990 [JP] Japan .................................. 2-60890
Sep. 28, 1990 [JP] Japan ................................ 2-262077

[51] Int. Cl.⁵ ............................................. B60K 31/04
[52] U.S. Cl. .................................. 74/866; 364/424.1; 364/426.04; 180/179
[58] Field of Search ............... 74/859, 866; 364/424.1, 364/426.04; 180/177, 179

[56] References Cited

U.S. PATENT DOCUMENTS

| | | | |
|---|---|---|---|
| 4,669,335 | 6/1987 | Matsuoka et al. | 74/866 |
| 4,697,478 | 10/1987 | Mastumoto et al. | 74/859 |
| 4,719,820 | 1/1988 | Hibino et al. | 74/866 |
| 4,846,019 | 7/1989 | Kumura | 74/866 X |
| 4,858,500 | 8/1989 | Harada et al. | 74/866 |
| 4,938,604 | 7/1990 | Naito et al. | 364/424.1 X |
| 4,982,805 | 1/1991 | Naitou et al. | 364/424.1 X |
| 5,019,979 | 5/1991 | Takahashi | 364/424.1 |
| 5,036,936 | 8/1991 | Kawano et al. | 180/179 |
| 5,048,631 | 9/1991 | Etoh | 180/179 |

FOREIGN PATENT DOCUMENTS

| | | |
|---|---|---|
| 51-22698 | 2/1976 | Japan . |
| 58-37368 | 3/1983 | Japan . |
| 59-192114 | 10/1984 | Japan . |
| 62-36889 | 2/1987 | Japan . |
| 62-137037 | 6/1987 | Japan . |
| 2166818 | 5/1986 | United Kingdom . |
| 2178119 | 2/1987 | United Kingdom . |
| 2191833 | 12/1987 | United Kingdom . |

Primary Examiner—Richard Lorence
Assistant Examiner—Khoi Ta
Attorney, Agent, or Firm—Fleit, Jacobson, Cohn, Price, Holman & Stern

[57] ABSTRACT

An automatic speed control system for a vehicle includes a throttle control for controlling a throttle valve opening based on a deviation between a target speed and an actual speed of the vehicle so as to accomplish the target speed. A down-shift device for making a down-shift operation in an automatic transmission, a steady judging device for judging a steady condition of the actual speed after the down-shift operation, and an up-shift device for making an up-shift operation in the automatic transmission, when a reduction of the throttle valve opening more than a predetermined value is detected, after the actual speed is judged to be in the steady condition, are provided. A proper speed control can be provided when the vehicle runs uphill, regardless of the length and/or gradient of the uphill path.

15 Claims, 16 Drawing Sheets

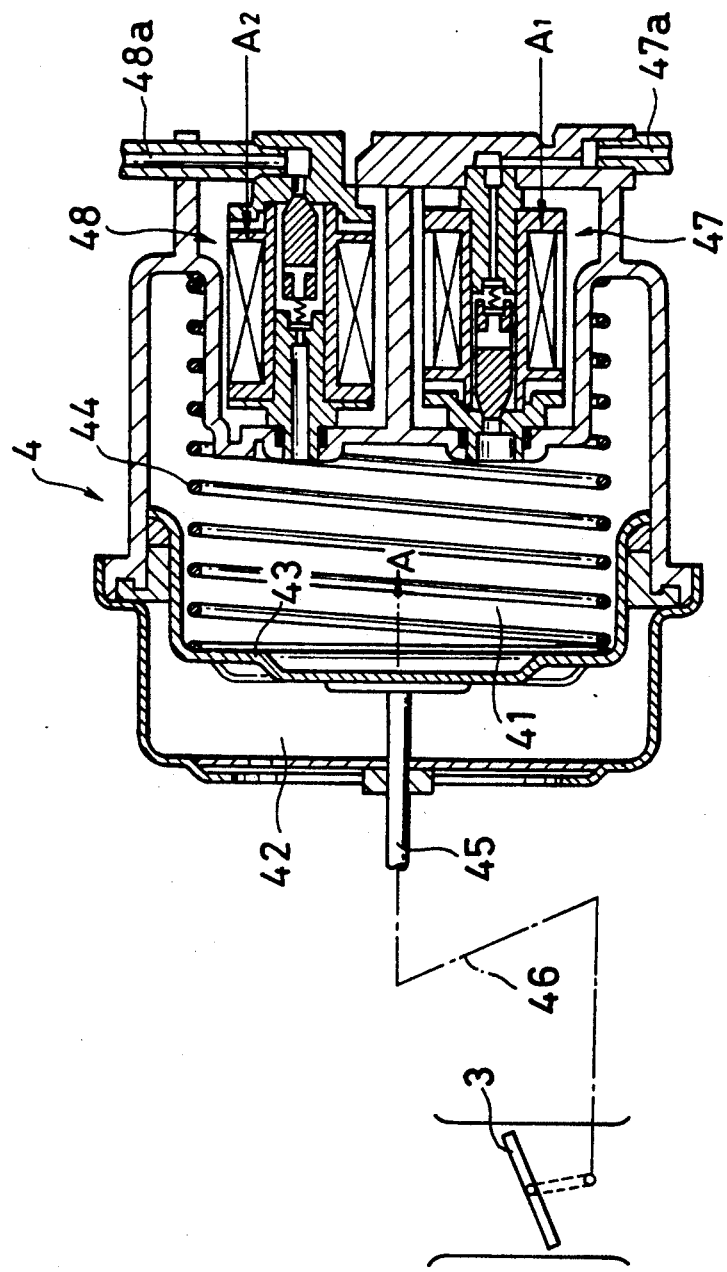

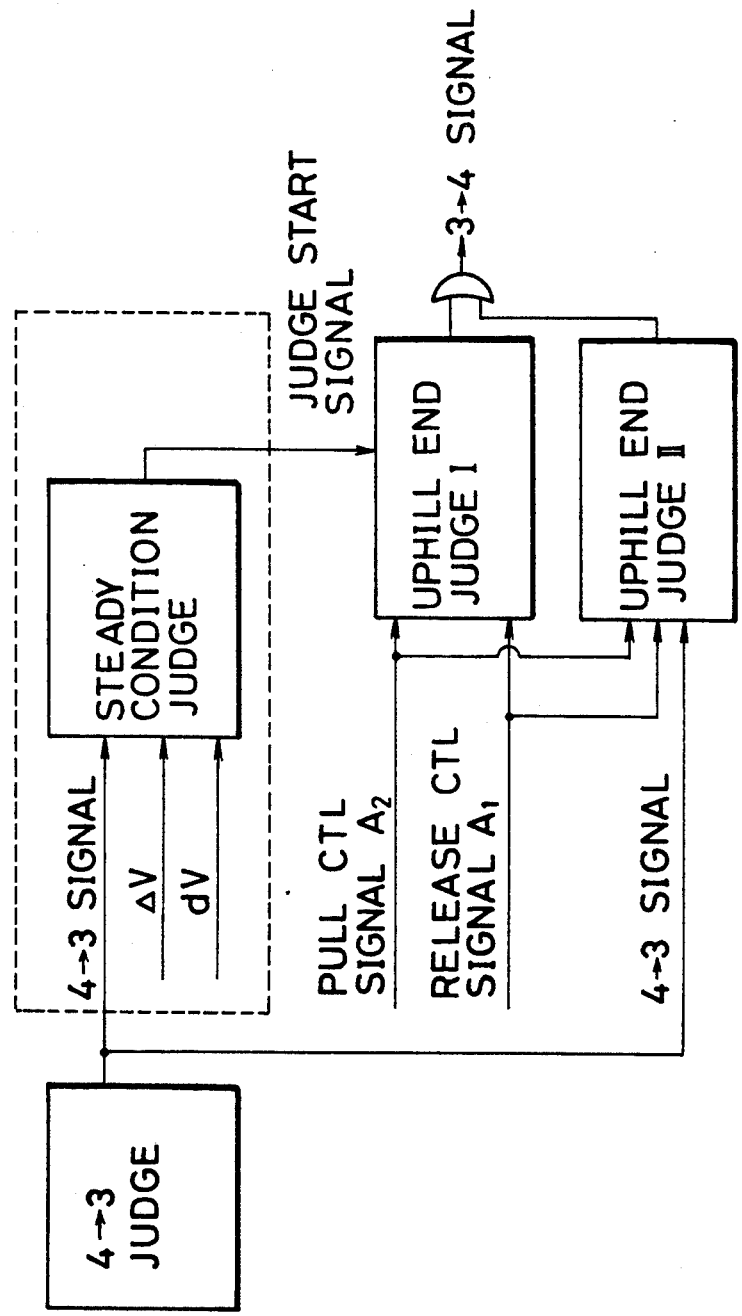

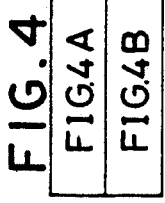
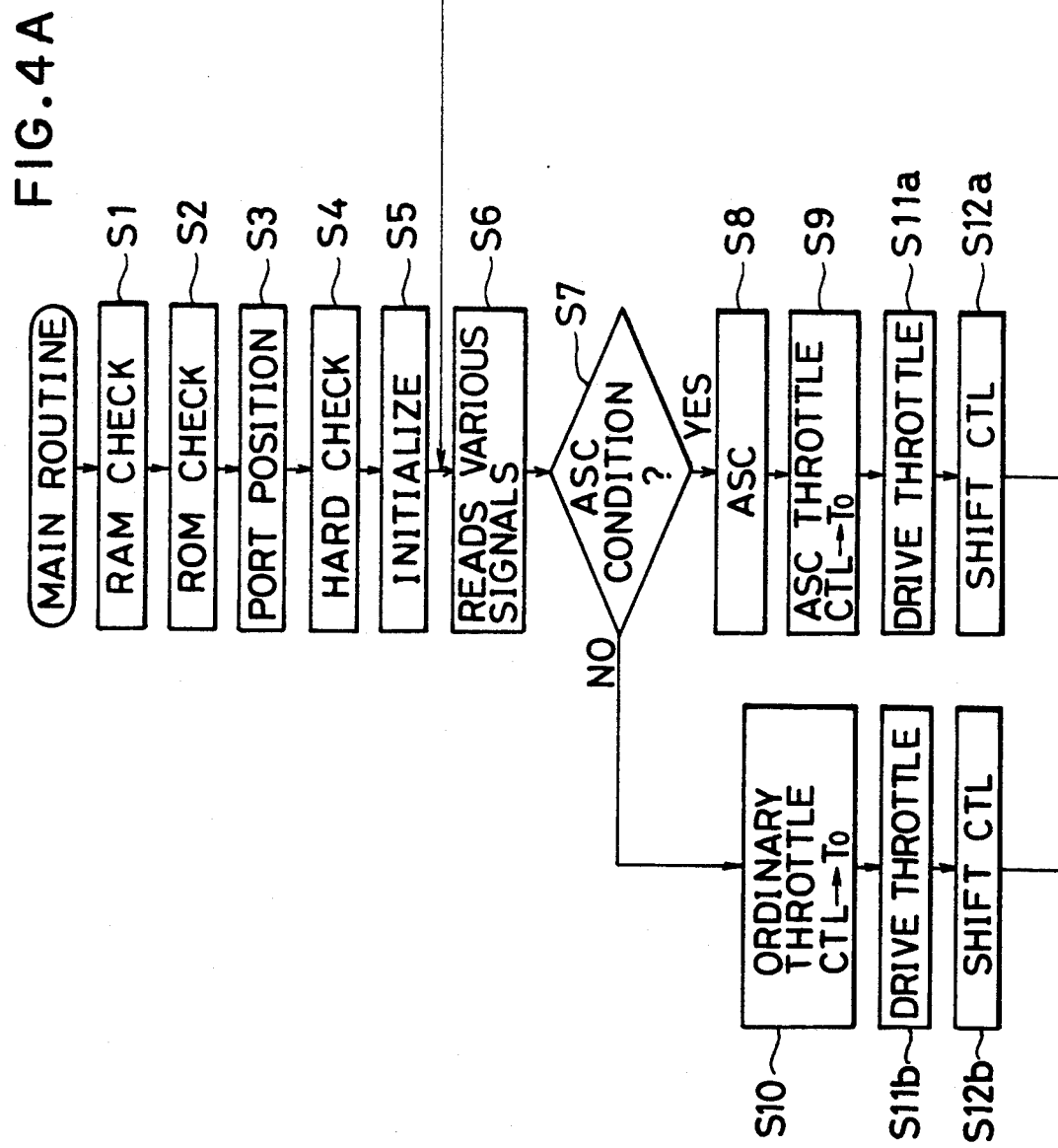

| dV \ ΔV | NB | NS | ZO | PS | PB |
|---|---|---|---|---|---|
| NB | NB | NB | NB | NB | NS |
| NS | NB | NS | NS | ZO | ZO |
| ZO | NS | ZO | ZO | ZO | PS |
| PS | ZO | ZO | PS | PS | PB |
| PB | PS | PB | PB | PB | PB |

AUTOMATIC FUZZY SPEED CONTROL SYSTEM FOR VEHICLE

BACKGROUND OF THE INVENTION

1. Field of the Invention

This invention relates to an automatic speed control system for a vehicle and more specifically, to a speed control for an uphill road use when the vehicle runs on an uphill running road.

2. Description of Related Art

There has been known an automatic speed control system for a vehicle in which a throttle valve opening is controlled based on a deviation between a target vehicle speed and an actual vehicle speed so that the vehicle speed is controlled to a predetermined value such a system is disclosed in Japanese Patent Publication 59-192114, laid open to the public in 1984.

Generally, in such a conventional speed control system, a shift stage change timing is changed based on the deviation between the target vehicle speed and the actual vehicle speed, the set time of a shift operation prohibit timer and the like when the vehicle runs in an uphill and downhill path. The vehicle speed is controlled to a target value in an uphill running condition and a downhill running condition, as disclosed in Japanese Patent Publication No. 62-36889, published for opposition in 1987, and Japanese Patent Public Disclosure No. 63-137037, laid open to the public in 1988.

For instance, in a conventional speed control system, when the vehicle is about to run into an uphill path, a down-shift operation is made in automatic transmission of the vehicle to provide enough a power to run the uphill path. Thereafter, a up-shift operation is made when a predetermined time has passed so that a proper shift stage can be obtained in response to the actual vehicle speed.

It should, however, be noted that such a proposed automatic speed control system has some disadvantages.

Since the timing of the up-shift operation is predetermined in accordance with the length of the uphill path, the up-shift operation may not be timely provided when the length of the uphill path is not consistent with the expected value. Such may occur, for example, when the path length is longer than the expected value or shorter than the expected value. As a result, in some cases, the down shift condition may be undesirably maintained even after the uphill path has passed. This causes an increased noise level, due to the fact that the vehicle runs in too low a gear stage. Alternatively, the up-shift condition may be established while the vehicle is still on the uphill path when the length of the path is longer than the expected value. In this case, the down-shift operation may be repeated to compensate for the speed drop of the vehicle. This may cause what is known as "hunting" in the speed control.

SUMMARY OF THE INVENTION

It is, therefore, an object of the invention to provide an automatic speed control system which can prevent hunting in the speed control.

Another object of the invention is to provide an automatic speed control system which can provide a proper shift stage when the vehicle exits a hilly path.

The above and other objects of the invention can be accomplished by an automatic speed control system for a vehicle comprising throttle control means for controlling a throttle valve opening based on a deviation between a target speed and an actual speed of the vehicle so as to accomplish the target speed. Down-shift means are provided for making a down shift operation in an automatic transmission. The control means includes steady judging means for judging a steady condition of the actual speed after the down-shift operation and up-shift means for making an up-shift operation in the automatic transmission when a reduction of the throttle valve opening more than a predetermined value is detected after the steady condition of the actual speed is judged. According to the above feature of the present invention, when the actual speed is decreased remarkably when the vehicle runs into an uphill path, the down-shift means carries out a down-shift operation in the automatic transmission to get a desirable acceleration performance. The up-shift means makes an up-shift operation in the automatic transmission when a steady or relatively stable condition of the actual speed is detected after the down-shift operation. Therefore, when the actual speed falls in the steady condition while the vehicle is running in on a relatively long and uphill path, the down-shift condition is maintained until the throttle valve opening is reduced remarkably. In this case, when the vehicle runs out of the uphill path and a remarkable reduction of the throttle valve opening is produced due to a reduction of running resistance, the up-shift operation is made. Thus, the up-shift operation is timely carried out when the vehicle runs on a relatively long and uphill path. In other words, the timing of the up-shift operation is precisely adjusted to termination of the uphill path to thereby suppress hunting in the vehicle speed control utilizing the automatic transmission.

According to another feature of the present invention, an automatic speed control system for a vehicle includes throttle control means for controlling a throttle valve opening based on a deviation between a target speed and an actual speed of the vehicle so as to accomplish the target speed, down-shift means for making a down-shift operation in an automatic transmission, steady judging means for judging a steady condition of the actual speed after the down-shift operation, and up-shift means for making an up-shift operation in the automatic transmission when a reduction of the throttle valve opening more than a predetermined value is detected before judging the steady condition of the actual speed.

In the above feature, when the actual speed is decreased remarkably as the vehicle runs into an uphill path, the down-shift means carries out a down-shift operation in the automatic transmission to get a desirable acceleration performance. The up-shift means makes an up-shift operation in the automatic transmission when a remarkable reduction of the throttle valve opening is detected before a steady or relatively stable condition of the actual speed is detected. Therefore, when the remarkable reduction of the throttle valve opening is produced as the vehicle is running on a relatively short and uphill path and, thereafter, when the actual speed falls in the steady condition, the up-shift operation is carried out without maintaining the down-shift condition. Thus, the up-shift operation is timely carried out when vehicle runs on a relatively short and uphill path. In other words, the timing of the up-shift operation is precisely adjusted to the termination of the uphill path to thereby quickly provide a desirable shift stage.

In a preferred embodiment, the steady judging means holds the steady condition of the actual speed when the deviation between the target speed and the actual speed becomes smaller than a predetermined value and when an acceleration of the vehicle becomes smaller than a predetermined value. Thus, the judgment of the steady condition can be readily made.

According to another feature of the present invention, the steady judging means holds the steady condition utilizing fuzzy theory based on the deviation mentioned above and the acceleration. Utilizing fuzzy theory facilitates the shift control program, since uncertainty in judging the steady condition can be eliminated.

The above and other objects and features of the present invention will be apparent from the following description taking while making reference to the accompanying drawings.

BRIEF DESCRIPTION OF THE DRAWINGS

FIG. 1A is an englarged sectional view of a throttle valve actuator appearing in FIG. 1;

FIG. 2 is a block chart of a control unit for the automatic speed control system;

DESCRIPTION OF THE PREFERRED EMBODIMENTS

Figure 1:
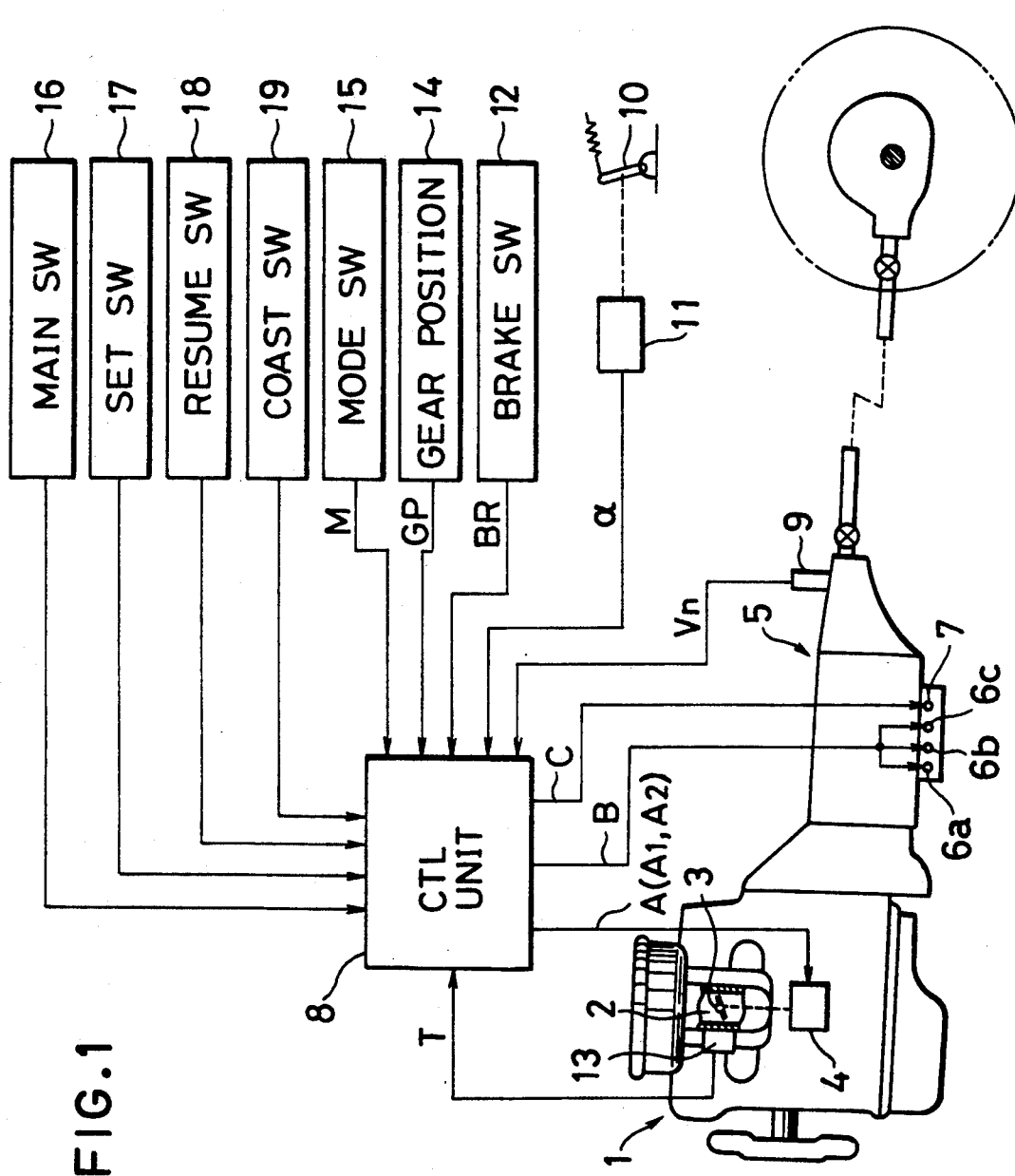
FIG. 1 is an entirely schematic view of an engine provided with an automatic speed control system in accordance with a preferred embodiment of the present invention.

FIG. 1 shows is a schematic view of an engine having an automatic speed control system in accordance with a preferred embodiment of the present invention.

Referring to FIG. 1, an engine 1 is provided with an intake passage 2 in which a throttle valve 3 is disposed. The throttle valve 3 is operated by a throttle valve actuator 4 to change the opening thereof. The actuator 4 is sectionally shown in FIG. 1A in detail. An automatic transmission 5 is provided with solenoids 6a, 6b and 6c for shift operations therein and a lock-up solenoid for lock-up control. The solenoids 6a, 6b and 6c are turned on and off to switch a hyraulic path in a hydraulic circuit (not shown) to selectively engage and disengage hydraulically driven members to establish a desirable shift stage of the automatic transmission. When the solenoid 7 is turned on and off, the lock-up clutch (not shown) is engaged and disengaged.

As shown in FIG. 1A, the throttle valve actuator 4 includes a negative pressure chamber 41 in which a negative pressure is produced, an atmospheric pressure chamber 42 communicated with the atmosphere, a diaphragm 43 driven by the negative pressure introduced into the negative pressure chamber 41, a spring 44 urging the diaphragm 43 in the opposite direction to an arrow A, a rod 45 joined with the digphragm 43, a throttle wire 46 operably connecting the rod 45 with the throttle valve 3 a release passage 47a communicated with the atmosphere, a release control valve 47 of a magnetic and proportional type for communicating the release passage 47a with the negative pressure chamber 41, a pull passage 48a to which the negative pressure is introduced and a pull control valve 48 of a magnetic and proportional type for communicating the pull passage 48a with the negative pressure chamber 41. A duty control is carried out on solenoids of the control valves 47 and 48 so as to control the negative pressure in the negative pressure chamber 41 produced by the engine 1 so that the diaphragm 43 and the rod 45 produce a reciprocating movement for causing the throttle value 3 to be opened and closed.

As shown in FIG. 1, there is provided a control unit 8 in which a vechicle speed signal Vn from a vehicle speed sensor 9 for detecting a vehicle speed, an acceleration pedal opening signal $\alpha$ from an acceleration sensor 11 for detecting an acceleration stroke of an acceleration pedal 10, a braking signal BR from a brake switch 12 for detecting a braking operation, a throttle opening signal T from a throttle sensor 13 for detecting an opening of the throttle valve 3, a gear position signal GP from a gear position sensor 14 for detecting a shift gear stage being selected in the automatic transmission 5 and a mode signal M from a mode switch 15 are introduced. The control unit 8 produces a throttle valve control signal A, a shift control signal B and a lock-up control signal C for the shift control solenoids 6a, 6b and 6c and the lock-up control solenoid 7. The throttle valve control signal A includes a release control signal $A_1$ and a pull control signal $A_2$ which are introduced to the release control valve 47 and the pull control valve 48 of the throttle valve actuator 4 as pulse signals of certain duty ratios, respectively, to control the openings of the release and pull control valves 47 and 48. Furthermore, the control unit 8 receives signals from a main switch 16, a set switch 17, a resume switch 18 and a coast switch 19. The main switch 16 turns on the power supply to start the automatic speed control system up. The set switch 17 is to set a target speed Vo. The resume switch 17 is to restore the target speed vo when the automatic speed control is restarted after the control is off.

Figure 3:
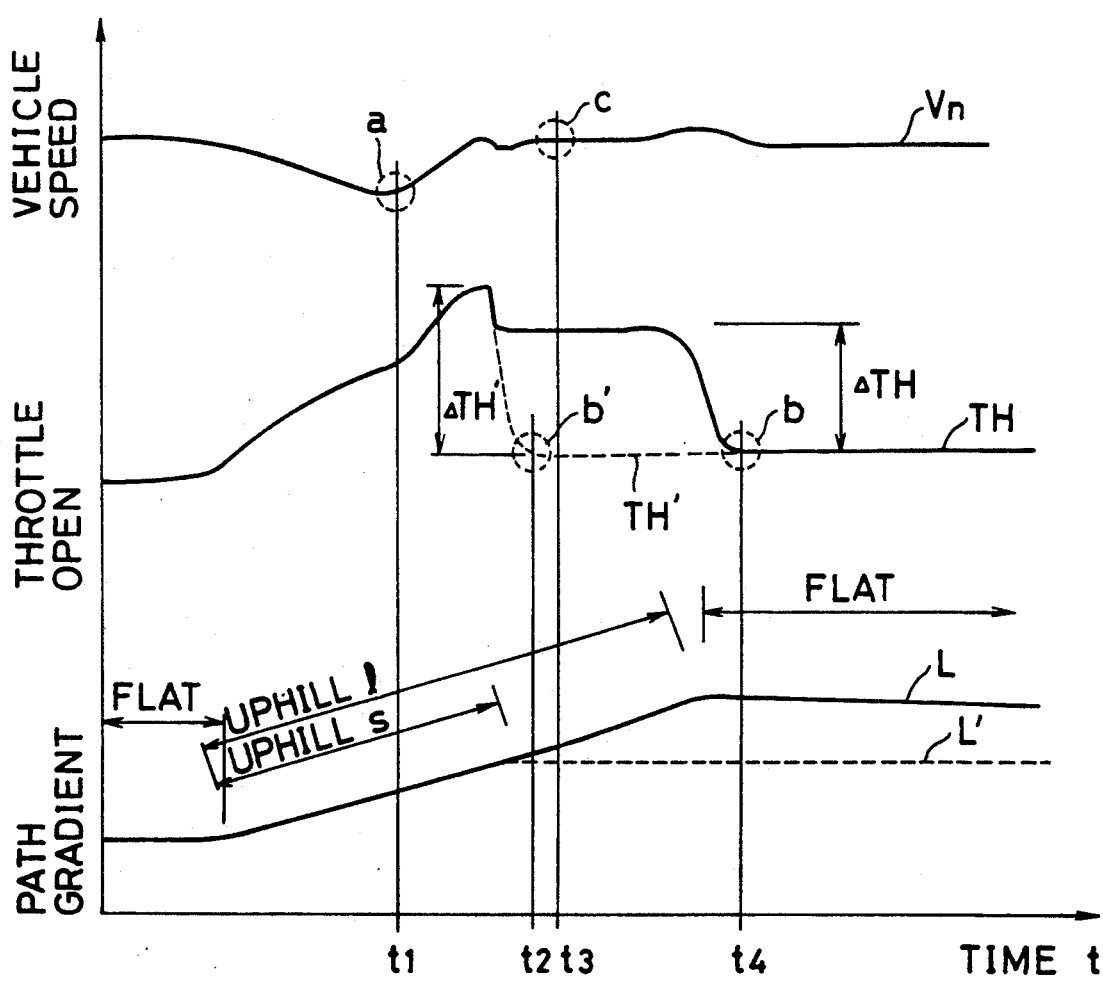
FIG. 3 is a time chart showing variation in vehicle speed and throttle opening.

FIG. 2 is a schematic block chart showing a logical relation in the control unit 8. FIG. 3 shows properties of the vehicle speed and throttle opening in an uphill running condition in a vehicle having the automatic speed control system.

As shown in FIG. 2, the control unit 8 is provided with a 4-3 shift judging device for judging a down shift operation from the fourth shift gear stage to the third gear stage when the vehicle is about to run into an uphill path, a steady condition judging device for detecting a steady condition of the vehicle speed based on an acceleration of the vehicle and a deviation between a target vehicle speed and an actual vehicle speed, and uphill end judging devices I and II for judging an end of the uphill path based on the operation of the throttle valve actuator 4.

The 4-3 shift judging device holds the 4-3 shift down operation when it is detected that the vehicle speed vn is reduced more than a predetermined value and the fourth shift stage is selected so that a shift control device is caused to make the down-shift operation and supply the steady condition judging device and the uphill end judging device II with the 4-3 down shift signal. The steady condition judging device I receives the 4-3 down-shift signal, the speed deviation between the target speed vo and the actual speed Vn a differential value of the actual vehicle speed Vn or the acceleration, of the vehicle. When the 4-3 shift judging device holds the down-shift operation, the steady condition judging device judges a steady condition of the actual vehicle speed vn based on the speed deviation and the acceleration of the vehicle. When the steady condition judging device holds the steady condition, the steady condition judging device produces a judge start signal to the uphill end judging device I for starting a procedure for judging whether or not the uphill path is terminated.

The uphill end judging device I receives the judge start signal, the release control signal $A_1$ and the pull control signal $A_2$ for judging the end of the uphill path. When the judge start signal is introduced, the uphill end judging device I calculates a throttle reducing stroke so as to judge the end of the uphill path based on the throttle reducing stroke. The uphill end judging device II receives the release control signal $A_1$ and the pull control signal $A_2$ for judging the end of the uphill path. The uphill end judging device II calculates the throttle reducing stroke of the throttle valve 3 and judges the end of the uphill path based on the reducing stroke.

When either the uphill end judging device I or II determines that the end of the uphill path has been reached, a 3-4 shift signal for making an up-shift operation from the third to fourth stage is produced to cause the shift control device to make the up-shift operation.

When the vehicle runs into an uphill path, the vehicle speed Vn is gradually reduced but a throttle valve opening TH is increased for increasing the actual vehicle speed Vn to thereby accomplish the target vehicle speed Vo. When the 4-3 shift judging device holds that the 4-3 down-shift condition should be made, the down-shift operation is carried out from the fourth to third stage at a time t1 (point a in FIG. 3). As a result, the vehicle speed accomplishes a substantially steady condition at a time t3 (point c in FIG. 3).

In a case in which the vehicle runs on a long uphill path l, when the throttle opening TH is remarkably reduced by a value Δ TH, the throttle opening is returned at a point b substantially to the throttle opening TH just before the vehicle runs into the uphill path, since a running resistance of the vehicle is remarkably reduced and thus an engine load is reduced as a result of the end of the uphill path. It should be noted that the vehicle has accomplished by a time t4 (the point b) the steady condition in the vehicle speed after the down-shift operation was made due to the long uphill path l. On the other hand, when the vehicle runs on a relatively short uphill path S, the throttle valve opening TH' is remarkably reduced at a time t2 when the running resistance is remarkably reduced as a result of the end of the short uphill path S. In this case, the throttle valve opening TH' is reduced at a point b'(time t2) in FIG. 3 to a value just before the vehicle runs into the short uphill path S. It should be noted that the vehicle cannot accomplish the target speed Vo by the time t2 (point b') after the down-shift operation is made due to the uphill path running.

The steady condition judging device holds the steady condition when the vehicle has accomplished the steady condition of the vehicle speed at the point c. The uphill end judging device I determines that the long uphill path l has ended when the remarkable reduction stroke Δ TH of the throttle valve opening TH is detected at the point b. On the other hand, the uphill end judging device II determines that the short uphill path S has ended when the remarkable reduction stroke Δ TH' is detected at the point b'. The up-shift operation is made at time t3 when the steady condition is detected after the remarkable reduction Δ TH'.

It will be understood that the point c is located between the points b' and b. The long uphill path l can be defined as an uphill path having such a length that the target vehicle speed Vo or the steady condition can be substantially accomplished by virtue of the automtic speed control after the down-shift operation is carried out during the uphill running. On the other hand, the short uphill path S can be defined as an uphill path having such a length that the target vehicle speed vo or the steady condition cannot be accomplished by virtue of the automtic speed control after the down-shift operation is carried out during the uphill running.

Figure 4B:
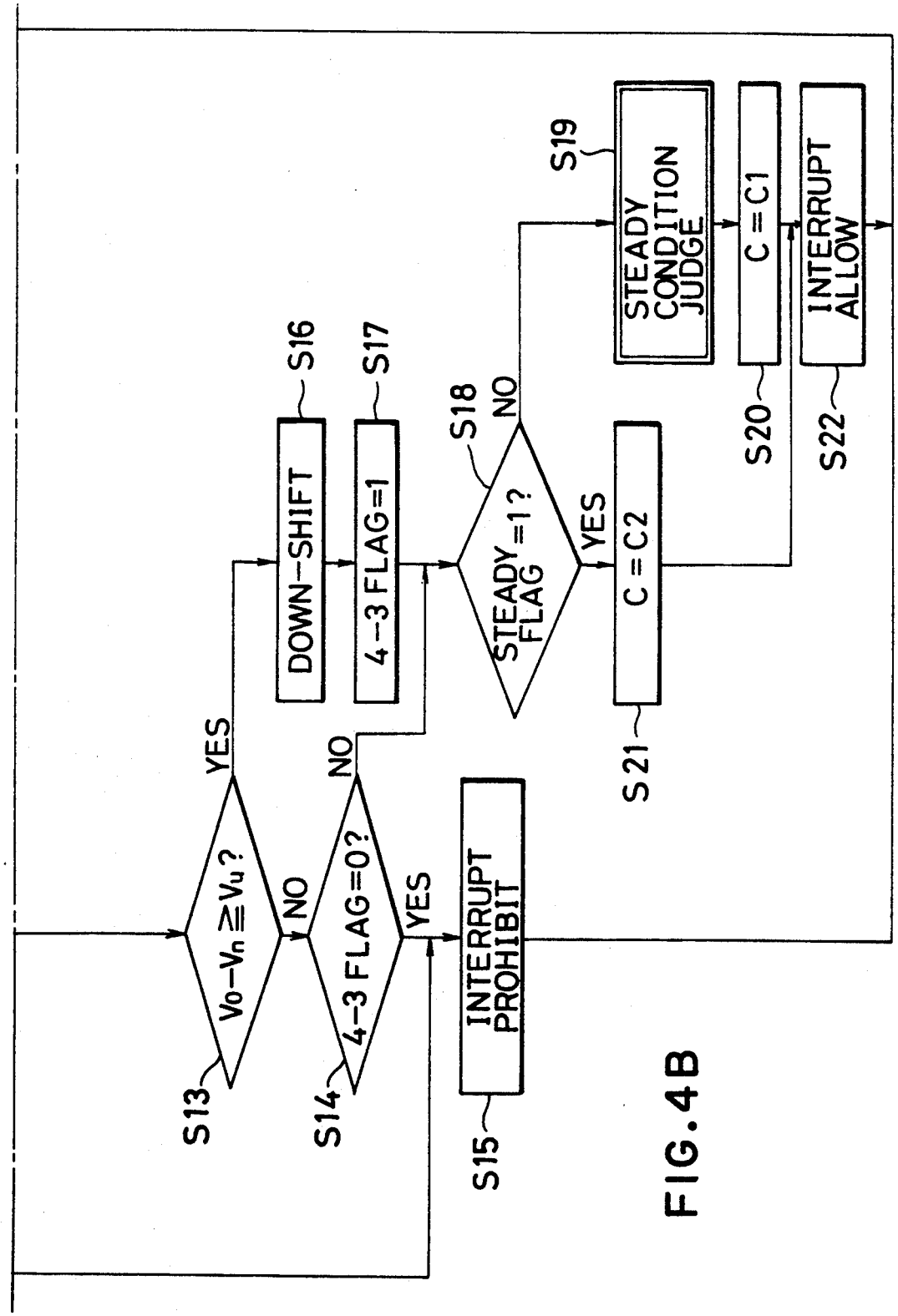
FIGS. 4 and 5 are flow charts showing a speed control carried out by the control unit.
Figure 5:
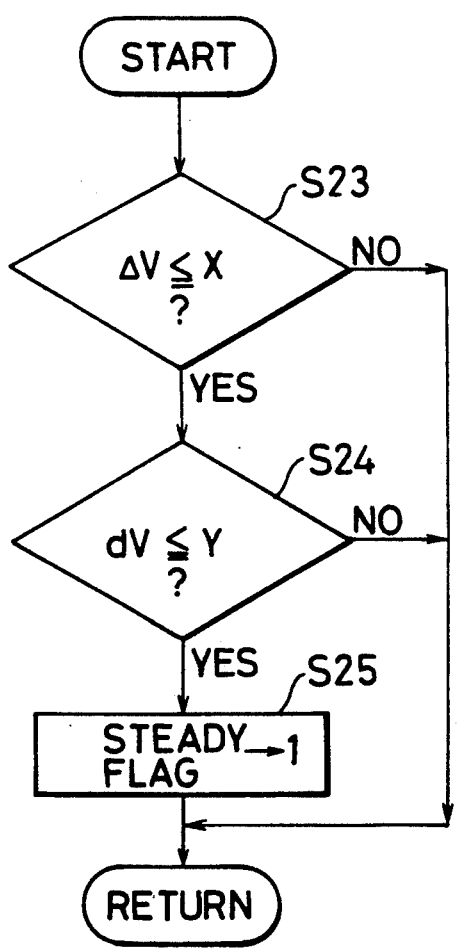
Figure 6A:
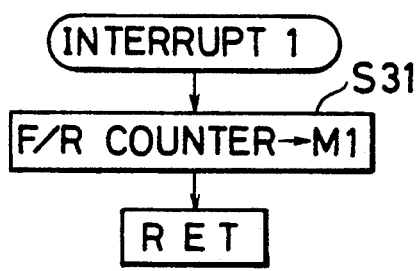
FIGS. 6A, 6B, 6C and 6D are flow charts of interrupt routines interrupting the main routines of FIGS. 4 and 5.
Figure 6B:
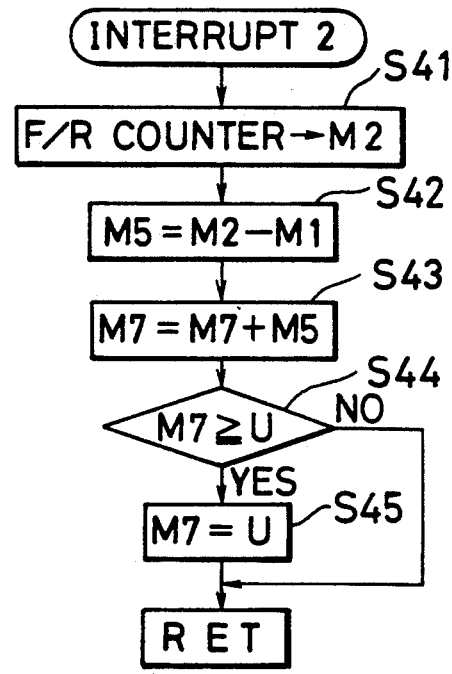
Figure 6C:
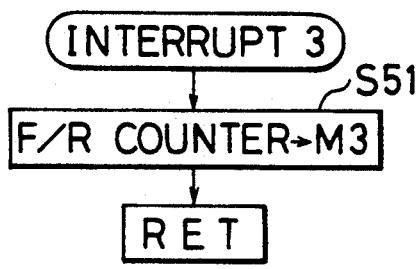
Figure 6D:
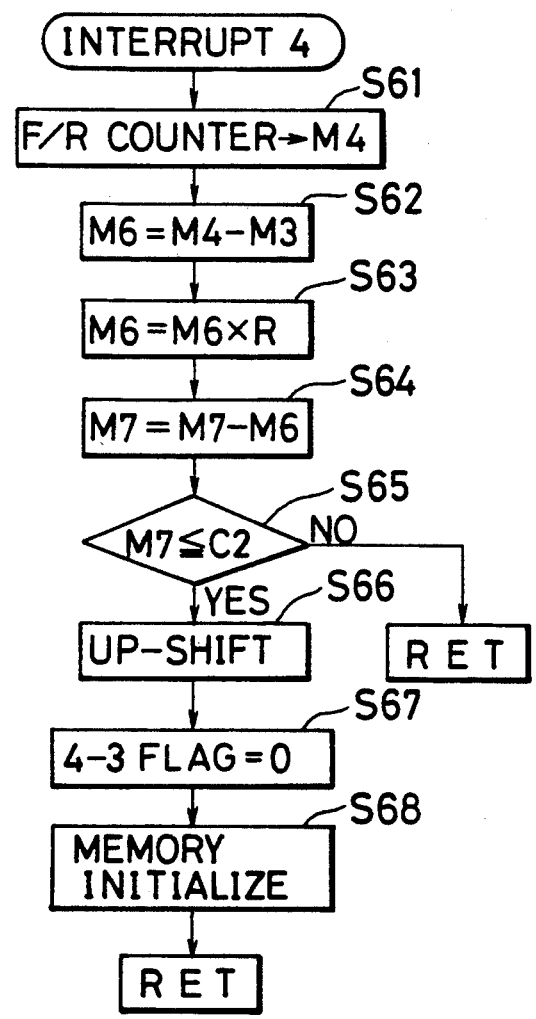
Figure 6E:
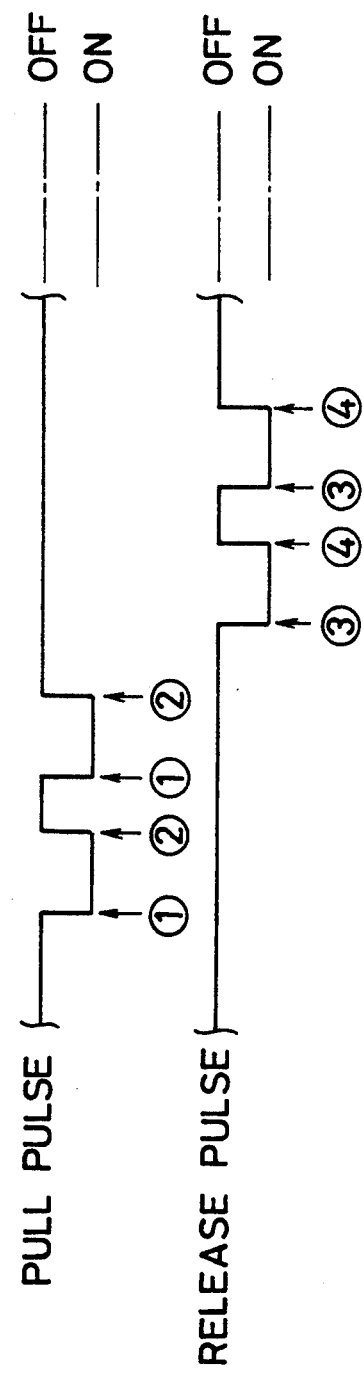
FIG. 6E is a time chart showing interrupting timing of the interrupt routines.

Referring to FIGS. 4 and 5, there are shown flow charts of a control utilizing the control unit 8 in the automatic speed control system in accordance with the preferred embodiment of the present invention. FIGS. 6A, 6B, 6C and 6D show interrupting routines, respectively, which are carried out by interrupting a main routine shown in FIG. 4. FIG. 6E is a time chart showing interrupting timings of the interrupting routines of FIGS. 6A, 6B, 6C and 6D. In FIG. 4, the control unit 8 checks up ROM and RAM in the memory on normality (step S1 and S2), initializes port positions of the control valves 6a, 6b, 6c and 7 (step S3), checks a hard system (step S4), initializes the system (step S5) and reads various signals (step S6).

The control unit 8 judges whether or not conditions for carrying out the automatic speed control are satisfied (step S7). For instance, when the main switch 16 is on, when a shift position is in a D(drive) range and when the vehicle speed is greater than 40 km/h, the control unit 8 holds that the automatic speed control (ASC) conditions are satisfied. When one of the above conditions is not satisfied, the control unit 8 holds that the automatic speed control should not be initiated. When a braking operation is made, even when all the above conditions are satisfied, the control unit 8 holds that the automatic speed control conditions are cancelled.

When the ASC conditions are held to be satisfied, the control unit 8 carries out the automatic speed control and sets a control mode such as a vehicle speed feedback control mode, an acceleration mode and the like in response to the operation of the set switch 17, resume switch 18, coast switch 19, acceleration pedal 10 and brake, and determines the target throttle opening To (step S9). On the other hand, when the control unit holds that the automatic speed control conditions are not satisfied in the judgment of step S7, the control unit 8 carries out an ordinary throttle valve control in which the target throttle opening To is set based on the stroke of the acceleration pedal 10 (step S10).

The control unit 8 produces the throttle valve control signal A, or the release control signal $A_1$ and the pull control signal $A_2$ in response to the target throttle opening To set in steps S9 or S10 (steps S11a or S11b) to provide the target valve opening To. The control unit causes the shift control device to produce the shift control signal B and lock-up control signal C for thereby accomplishing the shift control (steps 12a and 12b) in when the ASC is made and when the ordinary throttle control is made.

Next, the control unit 8 carries out the feedback control of the vehicle speed, in which the control unit 8 calculates a throttle opening Tv, for accomplishing the target vehicle speed Vo based on the deviation between the actual vehicle speed vn and the target vehicle speed vo and a change rate of the actual vehicle speed Vn and the like by utilizing PI-PD components. The actual vehicle speed Vn is controlled so as to converge to the target vehicle speed vo. When the braking operation is made during the feedback control, the control is stopped and the ordinary throttle control is restarted.

In the ordinary throttle valve control, an acceleration pedal opening or acceleration pedal stroke $\alpha$ is detected. A shift control map is selected in accordance with the shift mode pattern such as an economy mode, a normal mode and a power mode. A basic throttle valve opening is determined based on the aacceleration pedal opening $\alpha$ and a shift gear stage obtained in light of the shift control map selected. Various compensations, such as a compensation based on an acceleration pedal stroke change speed, a compensation based on the vehicle speed, a compensation based on the engine coolant temperature and the like are made on the basic throttle valve opening $\alpha$ to determine the target throttle valve opening To.

When the acceleration pedal opening $\alpha$ is increased more than a predetermined value $\alpha_0$, for example, 5% during the ASC, the control unit 8 stops the ASC and starts an acceleration mode. In the acceleration mode, the control unit 8 calculates the target throttle valve opening corresponding to the target vehicle speed vo in the feedback control and the basic throttle valve opening corresponding to the acceleration pedal opening $\alpha$ to determine a new target throttle valve opening To based on the sum of the two target throttle valve openings.

As shown in FIG. 4, control unit 8 compares the deviation between the actual vehicle speed vn and the target vehicle speed Vo with a predetermined value Vu to judge whether or not the vehicle is running into an uphill path (step S13). In this procedure, the control unit 8 reads out the reference deviation value Vu which is experimentally predetermined and memorized. The control unit 8 judges whether or not the deviation between the actual vehicle speed Vn and the target vehicle speed Vo is greater than the reference deviation value Vu in step S13.

When the judgment is NO, or when the actual deviation between the actual vehicle speed Vu and the target vehicle speed Vo is not greater than the reference deviation value Vu, the control unit 8 further judges whether or not the vehicle is running in with the third shift stage. When the vehicle is in the fourth shift stage, or when a 4-3 flag is zero, the control unit 8 continues the ASC without allowing the interruptive excecution of the interrupting routines (steps S14 and S15). On the other hand, when the judgment in step S13 is YES, or when the actual deviation is greater than the reference value Vu, the down-shift operation is made from the fourth shift stage to the third shift stage (step S16) and the 4-3 flag is set at 1 (step S17).

Next, the control unit 8 judges whether or not the actual vehicle speed Vn is in the steady condition, or whether or not a steady condition flag is zero. When the steady condition flag is not at a value of 1, or when the steady condition is not accomplished, the control unit 8 sets a shift-up threshold value C at a first theshould value C1 (steps S1 to S20) and allows the interruption of the interrupting routines (step S22). On the other hand, when the steady condition flag is at the value of 1 or when the vehicle is in the steady condition, the shift-up threshold value C is set at C2 (steps S18 and S21) and the control unit 8 allows the interruption of the interrupting routines 1 to 4 (step S22).

The threshold values C1 and C2 correspond to the reduction strokes $\Delta$ TH' and $\Delta$ TH, respectively, in FIG. 3. The value C1 is not greater than the value C2. The values of C1 and C2 are tuned so as not to produce a hunting of the control.

As shown in FIG. 5, the control unit 8 sets the steady condition flag at a value of 1. As a result, the control unit 8 holds the vehicle in the steady condition when the deviation is not greater than the value X and the acceleration of the vehicle is not greater than a value Y. If either the deviation in the vehicle speed is greater than the value X or the acceleration of the vehicle is greater than the value Y, the control unit 8 does not hold the steady condition of the vehicle speed Vn and does not set the steady condition flag at a value of 1.

As shown in FIG. 6E, the interrupting routines 1-2 interrupt the main routine at ON timing ① and OFF timing ② of a pulse signal of the pull control signal $A_1$ (referred to as pull pulse) to carry out the pull control valve 48 of the throttle valve actuator 4. The interrupting routines 3 and 4 interrupt the main routine at ON timing ③ and OFF timing ④ of a pulse signal of the release control signal A, (referred to as release pulse) to carry out release control valve 47 of the throttle valve actuator 4.

When the pull pulse signal is changed to an ON condition (timing ①), the interrupting routine 1 is carried out to memorize a counter value of free running in a memory M1 (step S31). When the pull pulse is changed to an OFF condition (timing ②), the interrupting routine 2 is carried out so that the counter value of free running is memorized in a memory M2 (step S41). The counter value in the memory M1 is subtracted from the from the counter value in the memory M2 to be memorized in a memory M5 (step S42). Further, the counter value in the memory M5 is added to a counter value in a memory M7 (step S43). In this case, when the memory M7 is initialized, the counter value in the memory M5 is memorized in the memory M7.

The counter value in the memory M7 attains a predetermined upper limit U. The counter value is maintained at the predetermined upper limit U (steps S44 and S45).

When the release pulse is changed to an ON condition (timing ③) , the interrupting routine 3 is carried out and the counter value of free running is memorized in a memory M3 (step S51). When the release pulse is changed to an OFF condition (timing ④), the interrupting routine 4 is carried out and the counter value of free running is memorized in a memory M4 (step S61). The counter value in the memory M3 is subtracted from the counter value in memory M4 and the resultant value is memorized in a memory M6 (step S62). The counter value in the memory M6 is multiplied by a coefficient R. The resultant value is memorized in the memory M6. The value in the memory M6 is subtracted from the counter value in the memory M7. The resultant value is memorized in the memory M7 (steps S63 and S64). The coefficient R is introduced for compensating the difference of the throttle valve opening corresponding to the pulses between the pull pulse and the release pulse in such a manner that the counter value in the memory M6 corresponding to an ON time of the release pulse can be properly subtracted from the counter value in memory M7 corresponding to an ON time of the pull pulse.

Thus, the counter value in the memory M7 corresponds to a difference between the ON time of the pull pulse and the compensated ON condition of the release pulse. The counter value in the memory M7, which is a negative value, is increased as the ON condition of the release pulse corresponding to the reduction stroke $\Delta$ TH or $\Delta$ TH' of the throttle valve 3 is increased beyond the ON time of the pull pulse corresponding to the increasing stroke of the throttle valve 3.

Next, the control unit 8 compares the counter value in the memory M7 with the shift-up threshold value $C_2$. When the counter value in the memory M7 is not greater than the threshold value $C_2$, or when the reduction stroke $\Delta$ TH or $\Delta$ TH' of the throttle valve 3 reaches a predetermined value, the up-shift operation is held to be made (steps S65 and S66). Thereafter, the 3-4 shift signal is produced for the shift control device.

The control unit 8 sets the 4-3 flag at a value of zero, and initializes the memories M1–M7 so that the interrupting routine 4 is stopped.

In the illustrated embodiment, the shift control in the ASC is carried out based on the reduction of the vehicle speed, the detection of the steady condition of the vehicle speed and the reduction stroke $\Delta$ TH or $\Delta$ TH' of the throttle valve 3. The control unit 8 holds that the vehicle has run into an uphill path when the actual vehicle speed vn is reduced greatly from the target value vo to make the down-shift operation. When the actual deviation between the actual vehicle speed vn and the target vehicle speed Vo is reduced below a predetermined value, or when the acceleraion dV of the vehicle is reduced below a predetermined value, the control unit 8 holds that the the vehicle falls in the steady condition. When a remarkable reduction stroke $\Delta$ TH after actual the control unit 8 holds the steady condition, the control unit 8 holds that the vehicle has run out of the uphill path and carries out the up-shift operation. Thus, the control unit 8 can properly detect the end of the relatively long uphill path. The vehicle accomplishes the steady condition of the vehicle speed after the down-shift operation is made and, thereafter the throttle valve 3 produces the remarkable reduction stroke so that the up-shift operation can be timely made.

On the other hand, the control unit 8 carries out the up-shift operation when the remarkable reduction stroke $\Delta$ TH' is detected before the the steady condition is detected after the down shift operation. Thus, the control unit 8 can properly detect the end of the relatively short uphill in which the uphill ends and the remarkable reduction stroke of the throttle valve 3 before the ASC accomplishes the steady condition of the vehicle speed after the down-shift operation so that the up-shift operation can be timely made.

According to the above control, when the vehicle runs on a relatively long uphill path, the up-shift operation is not carried out until the remarkable reduction stroke of the throttle valve is detected, even where the vehicle accomplishes the steady condition through the ASC. Thus, a hunting shift operation can be prevented. On the other hand, when the remarkable reduction stroke of the throttle valve is detected when the vehicle runs on a relatively short uphill path, the up-shift operation is carried out even before the vehicle accomplishes the steady condition through the ASC so that a responsive up-shift operation can be made.

Referring to FIGS. 7A, 7B, 7C and 7D, there is shown a modification in judging the steady condition in the vehicle speed by utilizing fuzzy theory.

Figure 7A:
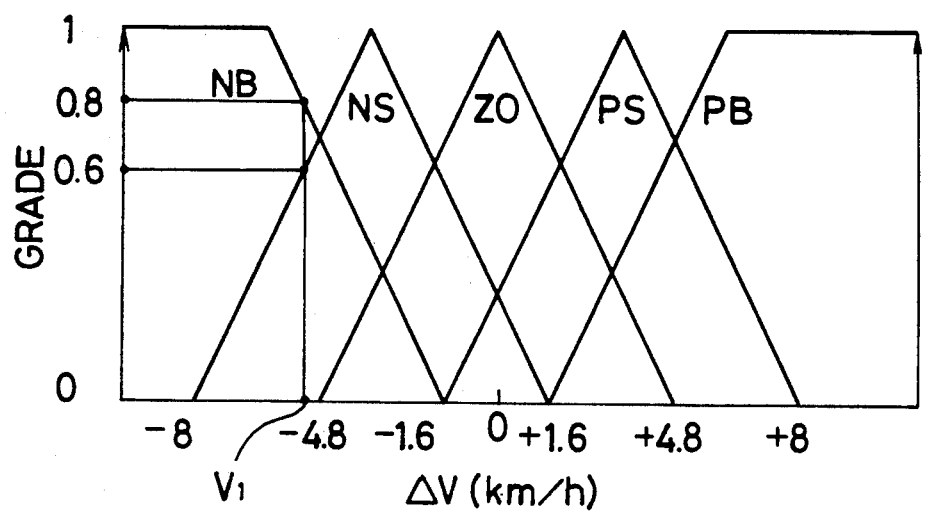
FIGS. 7A, 7B, 7C and 7D are graphical representations utilized in a modification of the preferred embodiment in FIG. 2 of the present invention in which the steady condition is judged based on fuzzy theory.
Figure 7B:
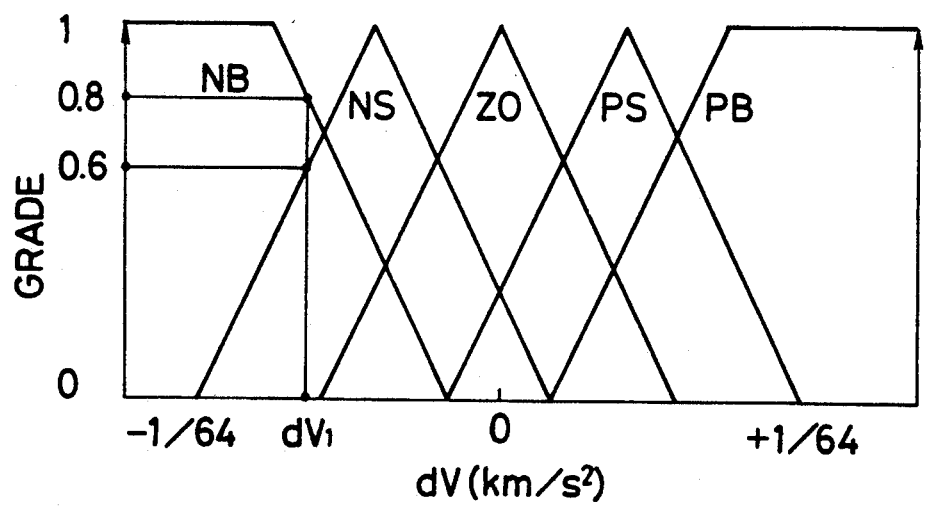
Figures 7C, 7D:
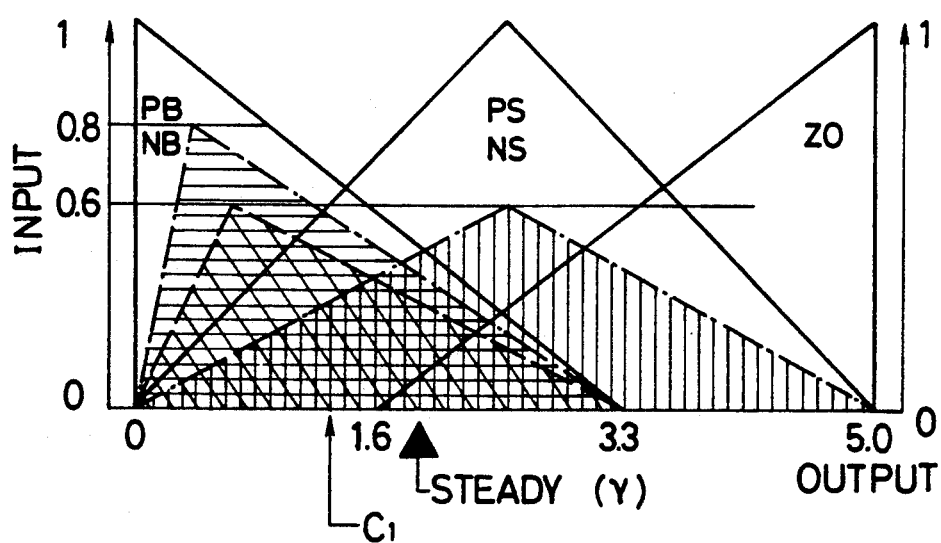

FIG. 7A shows an input membership function of the vehicle speed deviation $\Delta v = Vn - Vo$. FIG. 7B shows an input membership function of the acceleration of the vehicle dV. FIG. 7C shows a fuzzy rule for obtaining an objective fuzzy set based on each fuzzy set obtained in light of the membership functions of FIGS. 7A and 7B. FIG. 7D shows an output membership function for obtaining a final conclusion based on the objective fuzzy set. Characters NB, NS, ZO, PS and PB designate fuzzy sets, respectively. The fuzzy set NB denotes a set of Negative and Big. The fuzzy set NS denotes a set of Negative and Small. The fuzzy set ZO denotes a set of about Zero. The fuzzy set PS denotes a set of Positive and Small. The fuzzy set PB denotes a set of Positive and Big.

In FIG. 7A, when the deviation $\Delta V$ is $V_1$, grades of the fuzzy sets NB and NS are 0.8 and 0.6 respectively. In FIG. 7B, when the acceleration dV of the vehicle is $dV_1$, the grades of the fuzzy sets NB and NS are 0.8 and 0.6, respectively. Thus, the fuzzy sets of the vehicle speed deviation $\Delta V$ can be expressed as NB(0.8) and NS(0.6), respectively. The fuzzy sets of the acceleration dV of the vehicle can be expressed as NB(0.8) and NS(0.6), respectively, as well. The objective fuzzy sets NB, NB, NB and NS can be obtained based on the fuzzy sets NB(0.8) and NS(0.6) of the deviation $\Delta v$ and the fuzzy sets NB(0.8) and NS(0.6) of the acceleration dV through the fuzzy rule as shown in FIG. 7C by surrounding a broken line. In this illustrated embodiment, the smaller values are provided for the grades of the fuzzy sets NB, NB, NB and NS. For example, a grade of 0.6 of the objective fuzzy set is provided based on the fuzzy set NB(0.8) of the deviation $\Delta V$ and the fuzzy set NS(0.6) of the acceleration dV. The objective fuzzy set can be expressed as NB(NB(0.6)), which is the same as NB(0.6). Thus, the objective fuzzy sets NB(0.8), NB(0.6), NB(0.6) and NS(0.6) can be obtained respectively. They are depicted on FIG. 7D as the output membership functions. The two fuzzy sets NB(0.6), NB(0.6) are duplicated in FIG. 7D. A peak point of the value of the grade of the objective fuzzy sets NB(0.8), NB(0.6), NB(0.6) and NS(0.6) defines a triangular area as hatched in FIG. 7D. A point $C_1$ as a final value denoting a steady level of the vehicle speed, is a gravity center of the area which is projected on the abscissas in FIG. 7D. The point $C_1$ is compared with a predetermined threshold value $\gamma$ of the steady condition of the vehicle speed. In the illustrated example, since the point $C_1$ is smaller than the threshold value $\gamma$, the control unit 8 holds that the vehicle has not accomplished the steady condition. Utilizing the fuzzy theory facilitates simplification of the procedure for judging the steady condition of the vehicle speed. A DC motor can be employed for the throttle valve actuator.

Hereinafter, another embodiment of the present invention is described.

Figure 8:
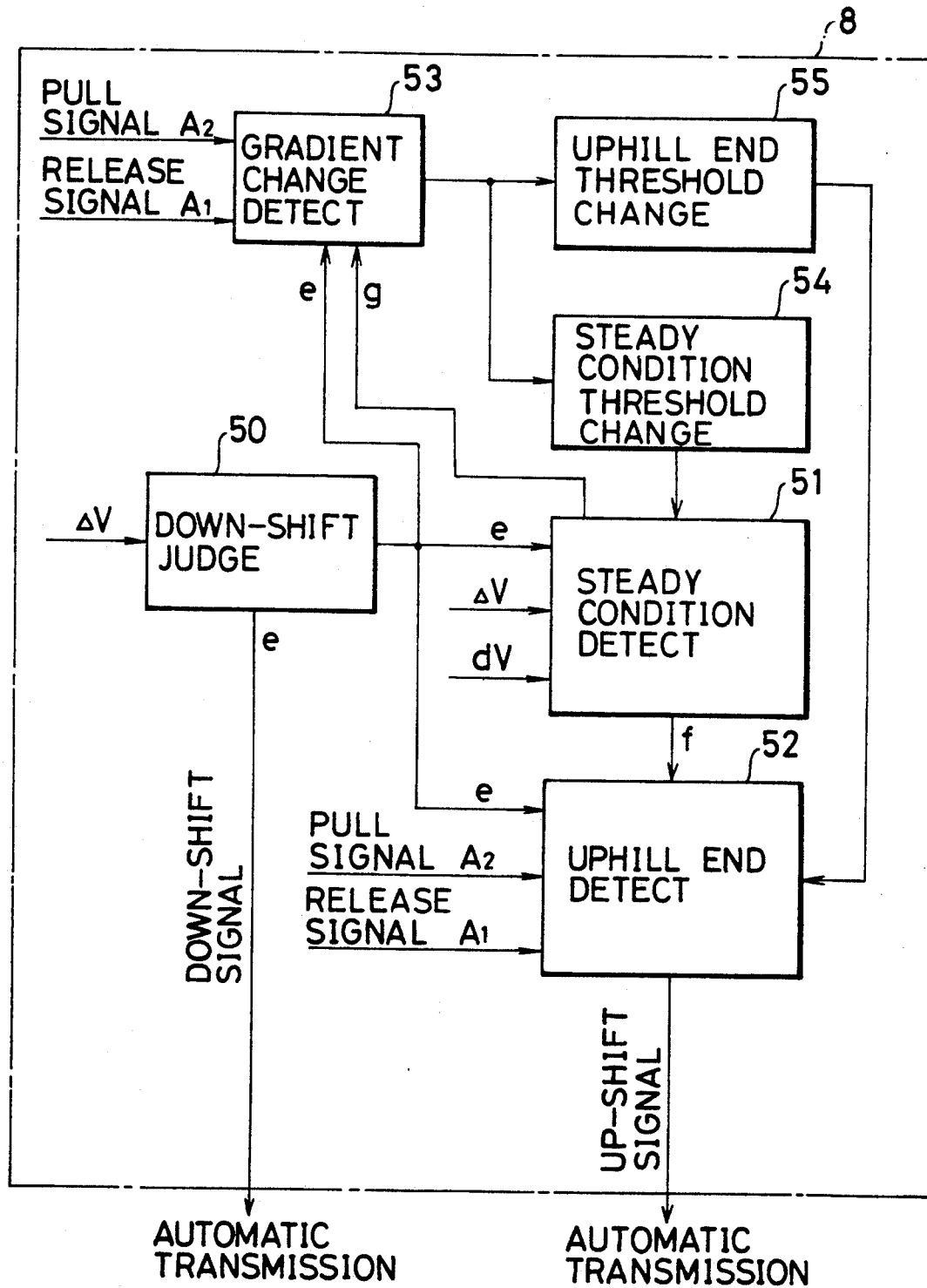
FIG. 8 is a block chart of the control unit similar to FIG. 2 but according to another embodiment of the present invention.

Referring to FIG. 8, control unit 8 includes a down shift judging device 50 for judging whether or not a down shift operation should be made, a steady condition judging device 51 for detecting a steady condition of the vehicle speed based on an acceleration of the vehicle and a deviation between a target vehicle speed and an actual vehicle speed, an uphill end detecting device 52 for detecting an end of the uphill path based on the operation of the throttle valve actuator 4, a gradient change detecting device 53 for detecting the gradient change in the uphill path on which the vehicle is running, a threshold change device 54 for changing a threshold value for the steady condition detection, and a threshold change device 55 for changing a threshold value for the uphill end detection. The down-shift judging device 50 holds that a down-shift operation should be made when the actual vehicle speed Vn is decreased below a predetermined value $\beta$ (8 km/h in this embodiment) from the target value Vo.

Figure 9:
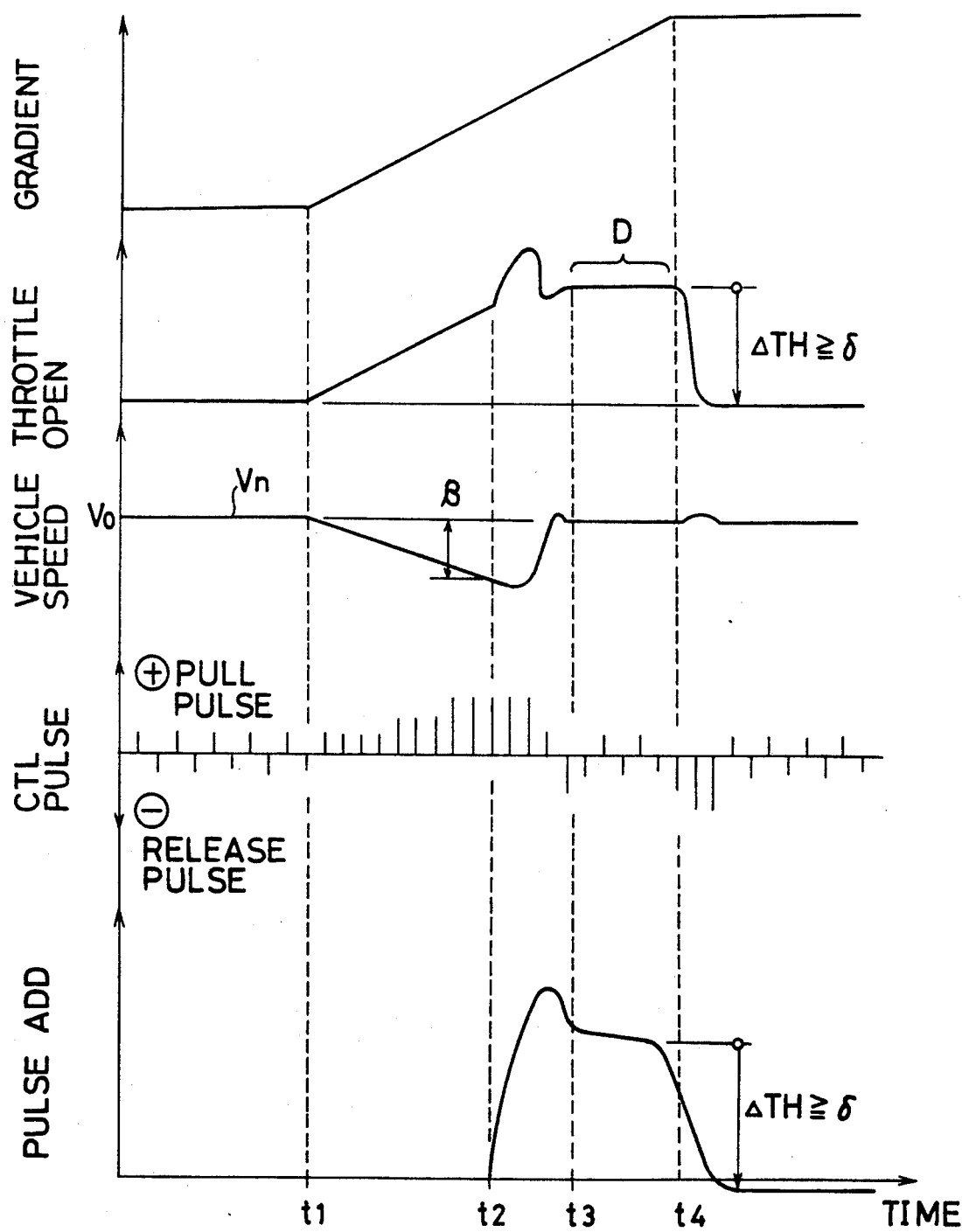
FIG. 9 and 10 are time charts showing the throttle opening, the vehicle speed and the like in accordance with the embodiment of FIG. 8.

Referring to FIG. 9, in the illustrated example, the vehicle runs on an uphill path of a constant gradient. When the vehicle runs into the uphill path at time t1, the vehicle speed vn is gradually reduced but a throttle valve opening TH is increased for increasing the actual vehicle speed Vn to thereby accomplish the target vehicle speed Vo. In a case in which the vehicle speed Vn is continuously decreased despite the increase in the throttle opening and the deviation $\Delta V = (Vo - Vn)$ is greater than the predetermined value $\beta$, the down-shift judging device 50 produces a down-shift signal e so that the down-shift operation is made from the fourth stage to the third stage at time t2. Although the vehicle speed vn is decreased and the throttle opening TH is increased just after the down-shift operation, the vehicle speed Vn begins to be increased and the throttle opening begins to be decreased to accomplish a substantially steady condition D at a time t3.

The steady condition D continues until the uphill path ends. When the vehicle reaches the end of the uphill path at time t4, the throttle opening TH is remarkably reduced to be returned substantially to the throttle opening TH present just before the vehicle runs ran into the uphill path, since a running resistance of the vehicle is remarkably reduced.

In detecting the end of the uphill path, the steady condition judging device 51 detects the steady condition D during the uphill running. In the steady condition D, the actual vehicle speed substantially converges to the target value vo. In other words, the deviation $\Delta V$ and the acceleration dV of the vehicle is substantially small. The end of the uphill is detected by means of the uphill end detecting device 52 in connection with the steady condition D detected. As shown FIG. 9, the control unit 8 adds up a differential value $(A_2 - A_1)$ between the output time of the pull control signal $A_2$ and the output time of the release control signal $A_1$ after the time t2 of the 4-3 down-shift operation. Practically, the signal $A_1$ is added up as a positive value when it comes out. On the other hand, the signal $A_1$ is added up as negative value when it comes out.

The control unit 8 memorizes the added differential value as a reference added value when the control unit 8 receives a steady condition detecting signal f showing the detection of the steady condition from the steady condition detecting device 51. The control unit 8 calculates a subtracted value by subtracting an added differential value from the added reference value periodically thereafter.

If the subtracted value is greater than a predetermined threshold value $\delta$, the uphill end detecting device 52 holds the end of the uphill. When the uphill end detecting device 52 determines that the uphill path has ended, the device 52 produces the 3-4 up-shift signal to cause the automatic transmission to make the 3-4 up-shift operation. It will be understood that the added differential value of the value $(A_2 - A_1)$ virtually corresponds to the throttle opening.

Figure 10:
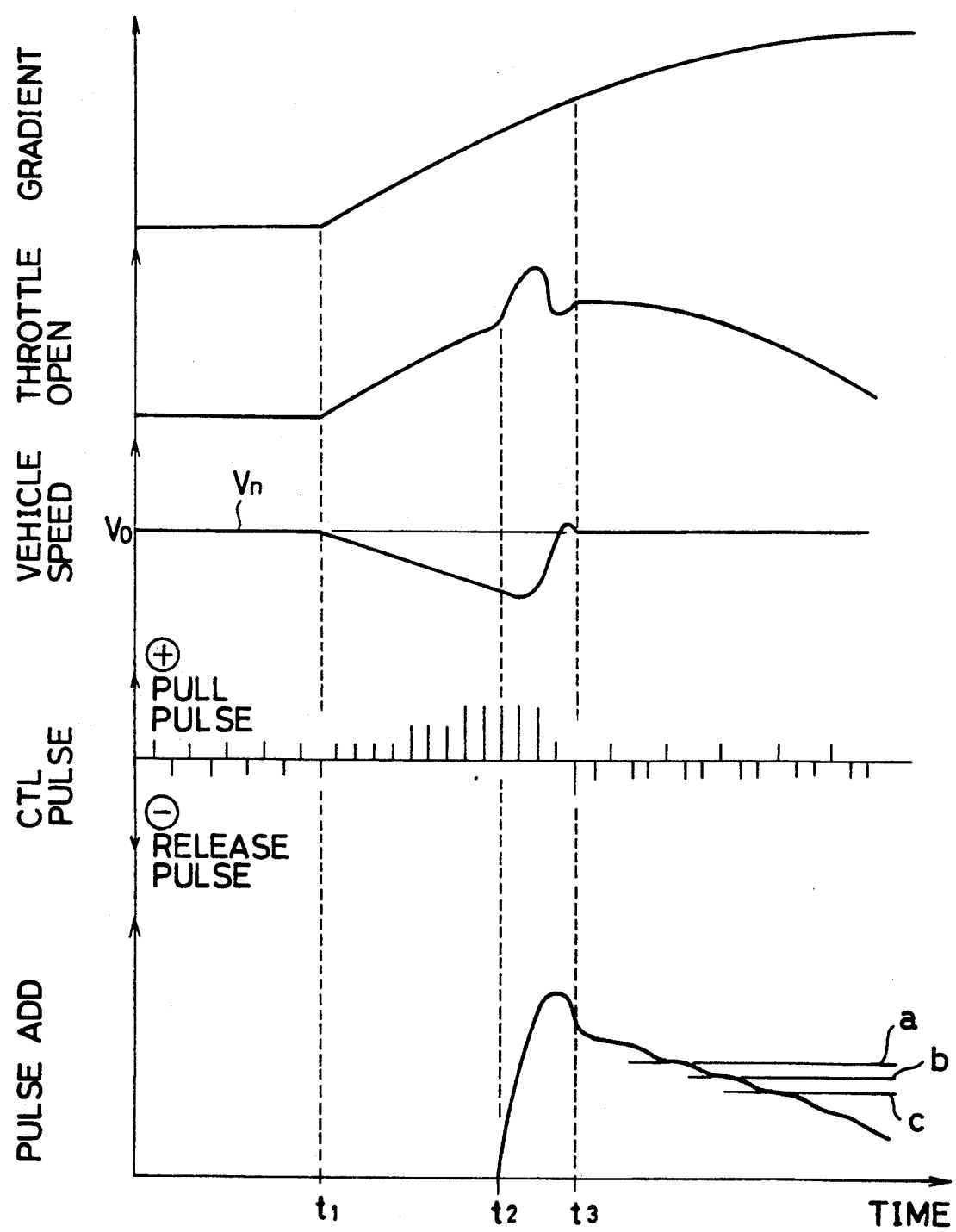

Referring to FIG. 10, in the illustrated example, the vehicle runs on an uphill path having a gradient which is changed. In this case, no steady condition appears during the uphill running, in the former example. The down-shift operation is made at the time t2 and the vehicle speed Vn converges substantially to the target value Vo at the time t3. After the time t3, although the target value Vo is maintained, the throttle opening is gradually reduced because of the change of the gradient of the uphill path.

As shown in FIG. 8, the gradient change detecting device 53 receives a down-shift signal e showing the 4-3 down-shift operation during uphill running, the pull control signal A, and the release control signal $A_1$. The control unit 8 adds up the differential value $(A_2 - A_1)$ after the down-shift operation. The steady condition detecting device 51 is provided with a threshold value $\gamma_0$ for judging whether or not the steady condition is accomplished in the uphill running after the down-shift operatin.

The gradient change detecting device 53 receives a steady condition detecting signal g showing the detection of the steady condition from the steady condition detecting device 51. There are provided three threshold values a, b, c (a>b>c) for the added differential value. The values a, b, c are smaller than corresponding threshold values for the uphill path of a substantially constant gradient.

When the vehicle runs on an uphill path of changing gradient, the added differential value is reduced to the value a without producing the steady condition D. In this case, the threshold value $\gamma$ is changed to a value $\gamma_a$ from the value $\gamma_0 (\gamma_a < \gamma_0)$. If the added differential value is further reduced to the value b without producing the steady condition D, a further threshold value $\gamma_b$ is set $(\gamma_b < \gamma_a)$. If the added differential value is still reduced without producing the steady condition D, still another threshold value $\gamma_c$ is set $(\gamma_c < \gamma_b)$ for judging the steady condition.

According to the illustrated embodiment, the control unit 8 is provided with the threshold change device 55 for changing the threshold value $\gamma$ for detecting the end of the uphill path. The threshold change device 55 reduces the threshold value $\delta$ for detecting the end of the uphill path as the threshold value $\gamma$ for detecting the steady condition is reduced. This is because the throttle opening is reduced at the time when the steady condition is judged as the threshold value $\gamma$ for detecting the steady condition is reduced and because the reduction stroke $\Delta$ TH of the throttle opening at the end of the uphill path is reduced as well. Thus, end of the uphill path can be properly detected regardless of the gradient thereof.

The fuzzy theory can be suitably applied for judgment of the steady condition in accordance with the illustrated embodiment as well as the former embodiment.

Figure 11:
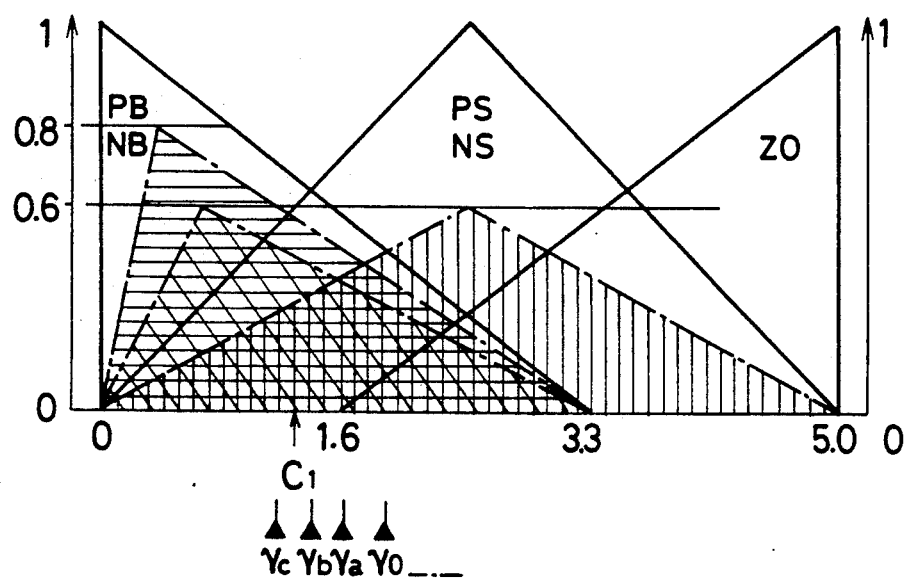
FIG. 11 is a graphical representation similar to FIG. 7D but showing a modification of the embodiment in FIG. 8.

As shown in FIG. 11, the resultant value $C_1$, obtained through the same procedure as the former embodiment, reflecting a steady level of the vehicle speed based on the deviation $\Delta V$ and the acceleration $dV$ of the vehicle, is compared with the threshold values $\gamma_a$, $\gamma_a$, $\gamma_b$ and $\gamma_c$, respectively, for judging whether or not the steady condition D is accomplished.

It should be noted that although the present invention has been described in connection with specific embodiments and reference has been made to the accompanying drawings, many modifications can be made by the those skilled in the art based on the foregoing. All of the modifications which fall within the scope of the present invention as defined by the attached claims are intended to be protected.

What is claimed is:

1. An automatic speed control system for a vehicle comprising:

throttle control means for controlling a throttle valve opening based on a deviation between a target speed and an actual speed of the vehicle so as to accomplish the target speed, down-shift means for making a down-shift operation in an automatic transmission, steady condition judging means for judging a steady condition after the down-shift operation;

up-shift means for making an up-shift operation in the automatic transmission when a reduction of the throttle valve opening more than a first predetermined value is detected, after determining the steady condition of the actual speed, by the steady condition judging means, and when a reduction of the throttle valve opening more than a second predetermined value is detected, before determining the steady condition of the actual speed, by the steady condition judging means.

2. An automatic speed control system as recited in claim 1 wherein the steady condition judging means holds the steady condition when the deviation is reduced below a predetermined value.

3. An automatic speed control system as recited in claim 1 wherein the steady condition judging means holds the steady condition when an acceleration of the vehicle is reduced below a predetermined value.

4. An automatic speed control system as recited in claim 1 wherein the steady condition judging means holds the steady condition when the deviation is reduced below a predetermined value and an acceleration of the vehicle is reduced below a predetermined value.

5. An automatic speed control system as recited in claim 1 wherein the steady condition judging means comprises steady level determining means for determining a steady level of the vehicle by means of a fuzzy theory based on the deviation and an acceleration of the vehicle, the steady condition judging means comparing the steady level determined by the steady level determining means with a threshold value for judging whether or not the steady condition is accomplished.

6. An automatic speed control system as recited in claim 1 wherein the up shift means makes the up-shift operation when the steady condition is detected and a reduction of the throttle valve opening more than a predetermined value is detected before the steady condition judging means holds the steady condition.

7. An automatic speed control system as recited in claim 6 wherein the steady condition judging means holds the steady condition when the deviation is reduced below a predetermined value and an acceleration of the vehicle is reduced below a predetermined value.

8. An automatic speed control system as recited in claim 6 wherein the steady condition judging means comprises steady level determining means for determining a steady level of the vehicle by means of a fuzzy theory based on the deviation and an acceleration of a vehicle, the steady condition judging means comparing the steady level determined by the steady level determining means with a threshold value for judging whether or not the steady condition is accomplished.

9. An automatic speed control system as recited in claim 2, and further comprising gradient change detecting means for detecting a gradient change of an uphill path on which the vehicle runs, and steady condition threshold changing means for changing the predetermined value of the deviation in accordance with the gradient change detected by the gradient change detecting means.

10. An automatic speed control system as recited in claim 3, and further comprising gradient change detecting means for detecting a gradient change of an uphill path on which the vehicle runs, and steady condition threshold changing means for changing the predetermined value of the acceleration of the vehicle in accordance with the gradient change detected by the gradient change detecting means.

11. An automatic speed control system as recited in claim 9 wherein the gradient change detecting means detects the throttle valve opening to thereby detect the gradient change of the uphill path, and the steady condition threshold change means reduces the predetermined value of the deviation as the throttle valve opening is reduced without accomplishing the steady condition.

12. An automatic speed control system as recited in claim 10 wherein the gradient change detecting means detects the throttle valve opening to thereby detect the gradient change of the uphill path, and the steady condition threshold change means reduces the predetermined value of the acceleration as the throttle valve opening is reduced without accomplishing the steady condition.

13. An automatic speed control system as recited in claim 9 further comprising uphill end detecting means for detecting an end of the uphill path in view of a predetermined threshold, and uphill end threshold change means for changing the predetermined threshold for the uphill end, the uphill end detecting means reducing the predetermined threshold as the predetermined value for judging the steady condition is reduced.

14. An automatic speed control system as recited in claim 13 wherein the uphill end detecting means detects the end of the uphill path based on a variable relating to the throttle opening.

15. An automatic speed control system as recited in claim 1 wherein the first predetermined value is smaller than the second predetermined value.

* * * * *